United States Patent [19]

Ikeda et al.

[11] Patent Number: 4,695,947
[45] Date of Patent: Sep. 22, 1987

[54] VIRTUAL ADDRESS SYSTEM HAVING FIXED COMMON BUS CYCLES

[75] Inventors: Koichi Ikeda, Atsugi; Kozi Nakamura; Toshihiro Okabe, both of Hadano, all of Japan

[73] Assignee: Hitachi, Ltd., Tokyo, Japan

[21] Appl. No.: 577,497

[22] Filed: Feb. 6, 1984

[30] Foreign Application Priority Data

Feb. 28, 1983 [JP] Japan .................................. 58-32573

[51] Int. Cl.[4] ..................... G06F 12/10; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,693,165 | 9/1972 | Reiley | 364/200 |
| 3,761,881 | 9/1973 | Anderson | 364/200 |
| 3,764,996 | 10/1973 | Ross | 364/200 |
| 4,373,179 | 2/1983 | Katsumata | 364/200 |
| 4,449,181 | 5/1984 | Young | 364/200 |
| 4,513,369 | 4/1985 | Sato | 364/200 |
| 4,520,441 | 5/1985 | Bandoh | 364/200 |

Primary Examiner—Archie E. Williams, Jr.
Assistant Examiner—Florin Munteanu
Attorney, Agent, or Firm—Antonelli, Terry & Wands

[57] ABSTRACT

In an information processing system utilizing a virtual storage, an address translation look-aside buffer for translating a logical address into a physical address is provided to access the main storage by use of the translated physical address. The processing system has a storage control unit for controlling the operation of the address translation look-aside buffer and the main storage, which are connected with a common bus through which addresses and data are transferred on a time-division basis. The storage control unit has a bus control circuit for controlling the common bus so that addresses are transferred from the translation look-aside buffer and data is transferred to the main storage on the common bus at different times.

3 Claims, 5 Drawing Figures

VIRTUAL ADDRESS SYSTEM HAVING FIXED COMMON BUS CYCLES

BACKGROUND OF THE INVENTION

The present invention relates to an information processing system with a virtual storage having an address translation unit and particularly to an information processing system having a storage control circuit implemented by adopting high density packaging techniques utilized, for example, for fabricating integrated circuits.

An information processing system utilizing a virtual storage includes an address translation unit for translating a virtual address into a rear address. In the adddress translation unit, an address translation table is utilized for address translation. The address translation table is generally placed in a main storage unit and is referred to each time address translation takes place; therefore, the overhead due to the address translation increases. As a result, the information processing performance is reduced. Considering this problem, translation pairs of virtual and real addresses obtained by previous address translation operations are stored in a high-speed storage unit other than the main storage unit to minimize the overhead. The high-speed storage unit for storing pairs of translation addresses is called a translation look-aside buffer (referred to as TLB hereinafter).

Upon receiving a virtual address for accessing the main sotrage unit from a central processing unit, a storage control circuit first refers to the TLB. If a real address corresponding to the received virtual address has already been registered to the TLB, the storage control circuit obtains the objective real address from the TLB and accesses the main storage unit by use of the real address. On the other hand, if it is found as a result of referring to the TLB that the real address has not been registered to the TLB, the storage control circuit obtains the rear address using the address translation table, then accesses the main storage unit and registers the obtained address to the TLB.

As described above, the storage control circuit transfers and receives various interface signals, for example, virtual addresses and read/write data for the central processing unit, real addresses and read/write data for the main storage unit, and virtual and real addresses for the TLB.

Consequently, the storage control circuit becomes complex. To solve this problem of the resultant complexity, respective interface signal lines are provided for respective interface signals.

In recent years, there is a trend that large-scale integrated circuits have been increasingly utilized in order to produce a compact, high-speed, highly reliable information processing system. Since the number of interface signal lines are limited in such an integrated circuit because of component packaging, a large-scale integration has been difficult for a storage control circuit requiring a considerable number of interface signals, so that reduction of the number of interface signal lines has long been a pressing need. For the prior art, see U.S. Pat. No. 3,761,881 and U.S. Pat. No. 3,693,165.

SUMMARY OF THE INVENTION

An object of the present invention is to solve the above-mentioned problems of the conventional art and to minimize the number of interface signal lines required for the storage control circuit without deteriorating the throughput of the main storage unit, thereby enabling the storage control circuit to be fabricated in an integrated circuit form.

In an information processing system adopting a virtual storage system, a real address corresponding to a virtual address is obtained by means of an address translation unit, then the main storage unit is accessed using the real address. In accordance with the present invention, the interface signal lines between the storage control circuit and the address translation unit are commonly used also to transfer signals between the storage control circuit and the main storage unit, and information transfer by the address translation unit and the main storage unit with respect to the storage control unit is carried out on a time sharing basis, thereby reducing the number of input/output (I/O) lines required for the storage control circuit without lowering the throughput of the main storage unit.

DESCRIPTION OF THE PREFERRED EMBODIMENT

Figure 1:
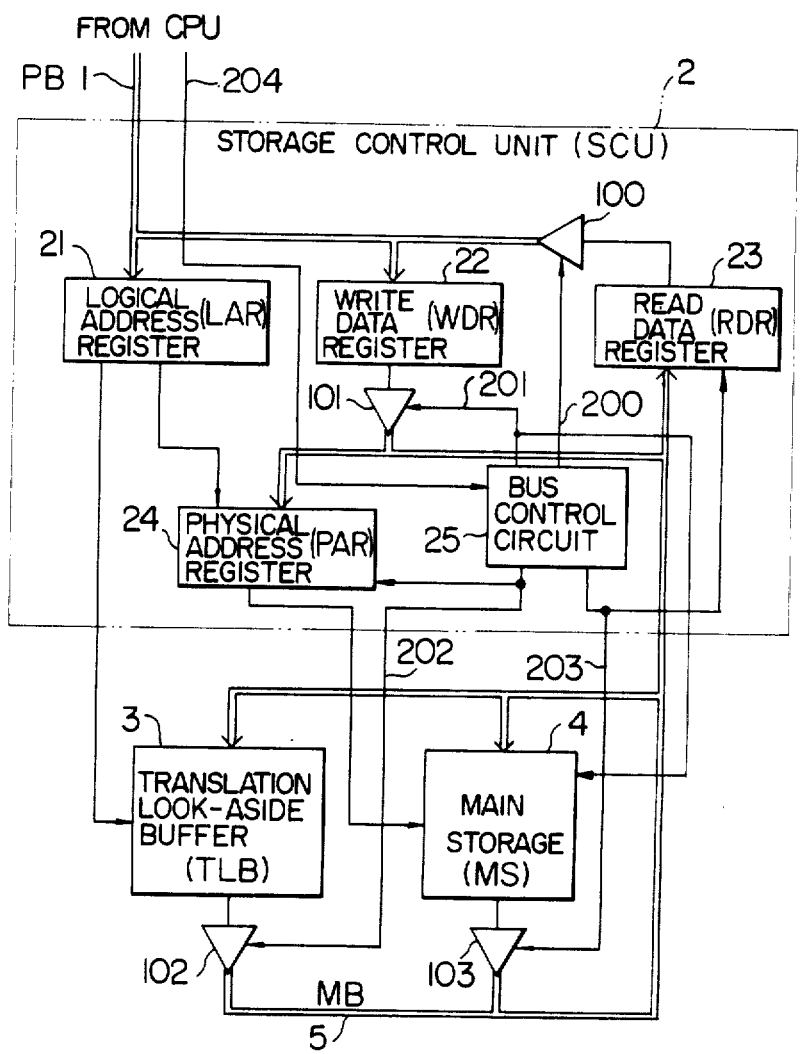
FIG. 1 is a block diagram of an embodiment according to the present invention.

FIG. 1 illustrates a block diagram of an embodiment according to the present invention.

A storage control unit 2 (referred to as SCU hereinafter) controls operations to access a main storage unit 4, which is connected to a central processing unit (not shown and referred to as CPU hereinafter) through a processor bus 1 (referred to as PB hereinafter) providing interface signal lines. Between the CPU and the SCU 2, information such as a virtual address for accessing the main storage unit 4, write data, and read data is transferred through the PB 1. Pairs of translation address, each comprising a logical (virtual) address and the corresponding physical (real) address, are stored in a translation look-aside buffer (TLB) 3. The main storage unit 4 is accessed by use of the physical address obtained as a result of the address translation.

The SCU 2 includes a logical address register (LAR) 21, a write data register (WDR) 22, a read data register (RDR) 23, a physical address register (PAR) 24, a bus control circuit (unit) 25, and gate circuits 100 and 101.

Figure 2:
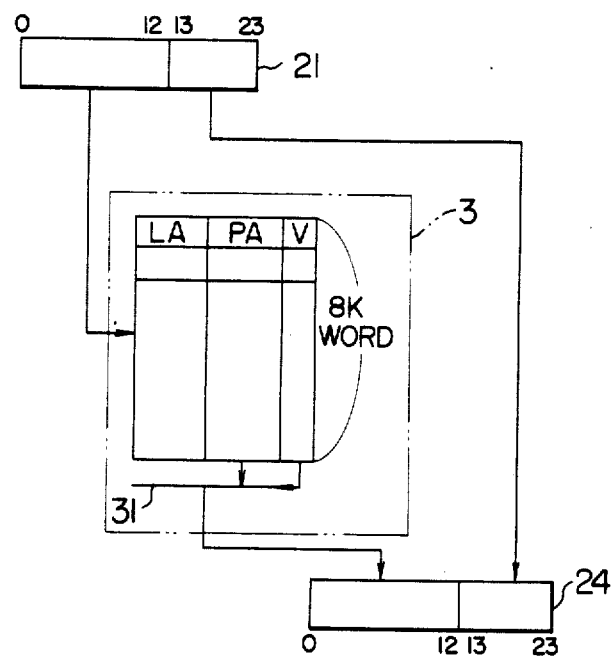
FIG. 2 is a schematic diagram illustrated for explaining address translation.

The PB 1 is connected to the input sides of the LAR 21 and WDR 22; further, it is connected to the output side of the RDR 23 through the gate circuit 100. A part of the output from the LAR 21 is used as an address for referring to the TLB 3, whereas the other part is delivered as an input to the PAR 24. FIG. 2 shows a detailed diagram of the LAR 21, TLB 3, ad PAR 24. In FIG. 2, a logical address and a physical address is indicated with 24 bits, respectively and the capacity of the TLB 3 is 8 kilowords. A 13-bit physical address (PA) (real address) and a 1-bit validity data (V bit) are stored in each word of the TLB 3. When the V bit is "1", the corresponding PA is assumed to be valid. The TLB 3 is referred to with 13 upper bits of the LAR 21 and the contents of the referred-to word are read out. If the V bit in the read data is "1", the corresponding PA is stored in the 13 upper bits of the PAR 24 through a selector 31. The 11 lower bits of the LAR 21 are stored in the 11 lower bits of the PAR 24. If the V bit is "0", the corresponding PA is generated by an address translation table (not shown) and is stored in the PAR 24.

In FIG. 1, a memory bus (MB) 5 comprises a common bus consisting of interface signal lines for transferring addresses and data between the SCU 2 and the TLB 3 and the main storage unit (MS) 4. In the SCU 2, the MB 5 is connected to the input sides of the PAR 24 and RDR 23 through gate circuits 102 and 103, and to the output side of the WDR 22 through the gate circuit 101. The bus control circuit 25 controls the gate circuit 101. The bus control circuit 25 controls the gate circuits 100–103 to determine whether the address/data is to be transferred to the PB 1 or MB 5.

Figure 3:
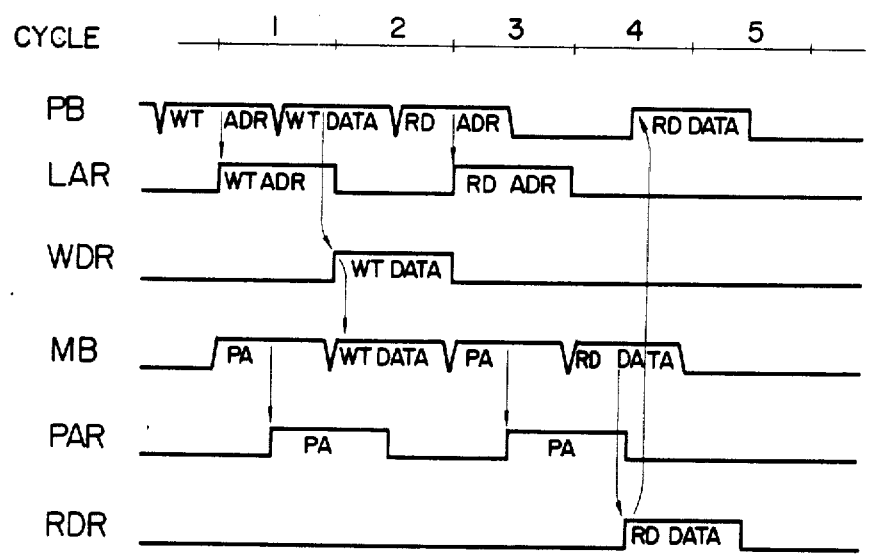
FIG. 3 is a timing chart showing the operation of the embodiment illustrated in FIG. 1.

Next, the operation of the system shown in FIG. 1 will be described in conjunction with an example in which a data write request and a data read request are successively issued from the CPU to MS 4. FIG. 3 illustrates timings associated with such an operation.

During cycle 1 of a write operation with respect to the MS 4, a logical address (write address: WTADR) given through the PB 1 is stored in the LAR 21, then the TLB 3 is referred to by use of the logical address stored in the LAR 21. The output (PA) from the TLB 3 is transferred to the PAR 24 through the MB 5, that is, the physical address is stored in the PAR 24. During cycle 2, write data (WTDATA) received through the PB 1 is stored in the WDR 22, and the stored data is written via the MB 5 in the MS 4 addressed by the PAR 24. Then, the write operation with respect to the MS 4 is terminated.

During cycle 3 of the next read operation on the MS 4, a logical address (read address: RDADR) received through the PB 1 is stored in the LAR 21, then the TBL 3 is referred to by use of the stored address and a physical address (PA) read from the TLB 3 is stored in the PAR 24 through the MB 5.

During cycle 4, read data (RDDATA) from MS 4 addressed by the PAR 24 is stored in the RDR 23 through the MB 5, then the stored data is outputted to the PB 1, which terminates the read operation from the MS 4.

The bus control circuit 25 for controlling the above-mentioned operations will be explained in detail with reference to FIGS. 4 and 5.

Figure 4:
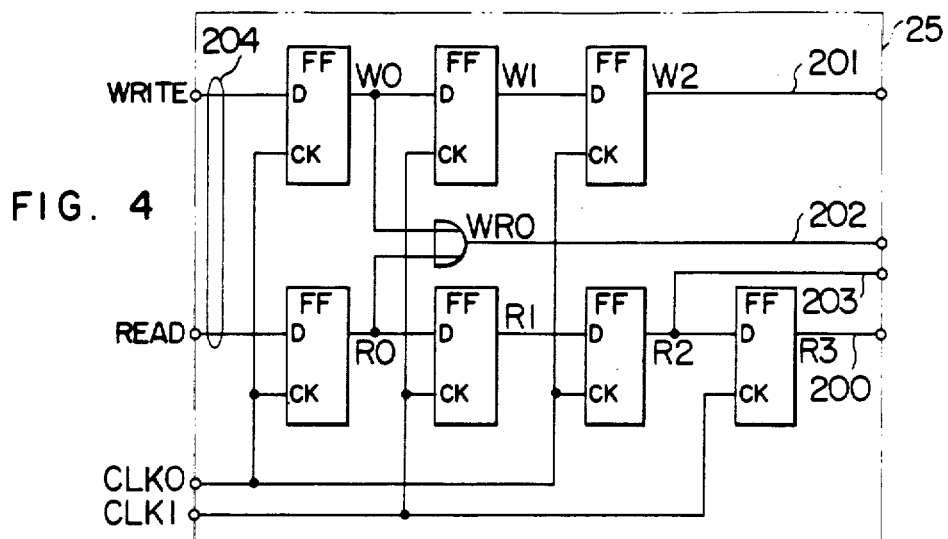
FIG. 4 is a detailed block diagram of a bus control circuit.
Figure 5:
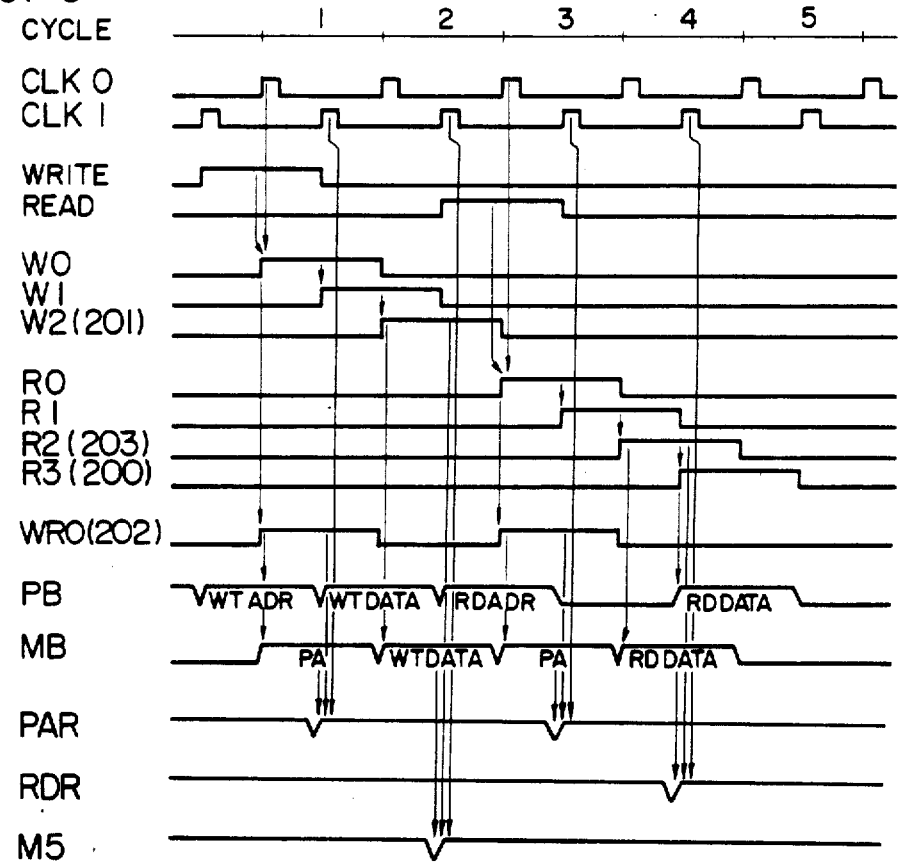
FIG. 5 is a timing chart illustrating the operation of the bus control circuit shown in FIG. 4.

FIG. 4 is a block diagram illustrating an embodiment of the bus control circuit 25. FIG. 5 shows the timing chart of operations of the bus control circuit 25.

In FIG. 4, a write request signal (WRITE) and a read request signal (READ) from the CPU to the MS 4 are inputted through a request line 204 to the first flip-flop (FF) of a flip-flop group comprising flip-flops connected sequentially which is controlled by clock 0 (CLK0) and clock 1 (CLK1). CLK0 is a signal which is outputted in synchronism with the beginning of each cycle, while CLK1 is outputted at an intermediate point of each cycle. The WRITE signal is stored in a 3-stage FF section controlled in accordance with a series of clocks CLK0-CLK1-CLK0. An output (W0) from the first FF is connected to the gate circuit 102 (FIG. 1) through an output (WR0) 202 from an OR gate circuit, and an output (W2) 201 from the third FF is connected to the gate circuit 101 (FIG. 1).

The READ signal is stored in a 4-stage FF section contrlled by a series of clocks CLK0-CLK1-CLK0-CLK1. An output (R0) from the first FF is connected to the gate circuit 102 through the output (WR0) from the OR gate circuit, an output (R2) from the third RR is connected to the gate circuit 103, and an output (R3) 200 is connected to the gate circuit 100.

Next, operations of output signals R3 200, W2 201, WR0 202, and R2 203 which control the gate circuits 100–103 will be explained in conjunction with read and write operations described above.

During cycle 1 of a write operation, the W0 is enabled and opens the gate circuit 102 via gate WR0 and line 202, causing the PA to be delivered to the MB 5. At this time, the W2 and R2 are not enabled and the gate circuits 101 and 103 are closed, so the PA can be transferred from the TLB 3 to the PAR 24 through the MB 5. The PA is stored in the PAR 24 at the timing of CLK 1 when WR0 (202) is enabled, as seen in FIG. 5.

During cycle 2, the W2 is enabled and opens the gate circuit 101 via line 201, which causes the WTDATA to be transmitted to the MB 5. In this case, the W0, R0, and R2 are not enabled and the gate circuits 102 and 103 are closed, thus the WTDATA is enabled to be transferred to the MS 4 through the MB 5. The WTDATA is stored in the MS 4 at the timing of CLK 1 when W2 (201) is enabled, as seen in FIG. 5.

Also in a read operation, the gate circuits 102, 103, and 100 are controlled by the R0, R2, and R3, respectively in a similar manner to the write operation.

As explained above, the bus control circuit 25 is provided with a function for controlling the gate circuits 100–103 to prevent two or more data from existing on the bus at the same time. In other words, the PAR 24 fetches the PA on the MS 5 at the timing of CLK 1 when the WR0 (202) is enabled and the RDR 23 fetches the RDDATA on the MB 5 at the timing of CLK 1 when the R2 (203) is enabled.

The data output to the MB 5 is processed in the same way as for a time-division operation as follows: The output from TLB 3, the write data to the MS 4, and the read data from the MS 4 are processed in cycles 1 and 3, cycle 2, and cycle 3, respectively. Therefore, the TLB 3 and MS 4 can be connected to the storage control circuit 2 by use of the same signal line without causing deterioration in the throughput of the MS 4.

If an objective physical address is not found in the TLB 3, the physical address is generated by using the address translation table provided in the MS 4, then the physical address is stored in the PAR 24 via the MB 5 and is simultaneously registered to the pertinent address in the TLB 3 indicated by the logical addess (13 upper bits) stored in LAR 21. Since the address translation processing has been widely known, the configuration necessary for the address translation is omitted in FIG. 1.

According to the embodiment of the present invention as described above, the storage control circuit is connected to the main storage unit and the address translation buffer, and the address translation buffer is referred to in a period of time between the operations for accessing the main storage unit; consequently, the number of interface signal lines required for the storage control circuit is reduced without deteriorating the throughput of the main storage unit, thereby facilitating manufacture of the storage control circuit in an integrated circuit form.

Although an address translation buffer has been explained as an example of the address translation means in the embodiment, it will be appreciated that the address translation buffer is set forth only by way of explanation and does not limit the present invention.

Furthermore, the same 4-byte bus line has been described as the interface signal line for transferring the read/write information between the storage control circuit and the main storage unit as well as the address translation means in the embodiment; however, different bus lines may be used for the read and write information, respectively; moreover the bus width is not limited to four bytes.

What is claimed is:

1. An information processing system comprising:

a processor unit;

a main storage;

a storage control unit coupled between said processor unit and said main storage for controlling data-transferring operations between said processor unit and said main storage in response to receipt of a logical address from said processor unit, including a logical address register for storing said logical address received from said processor unit, a physical address register for storing a physical address to be supplied to said main storage for accessing said main storage, a write data register for storing data to be written in said main storage, and a read data register for storing data read from said main storage;

address translation means connected to said storage control unit for translating said logical address stored in said logical address register into a physical address; and bus means connected to said main storage, said address translation means, said write data register, said read data register, and said physical address register for transferring data and addresses therebetween;

said storage control unit including bus control means for controlling said bus means in such a manner that at any time there is performed only one of two operations which consist of transferring a physical address obtained from said address translation means to said physical address register and transferring data between said storage control unit and said main storage, said bus control means including means for controlling said bus means to effect transferring of a physical address obtained from said address translation means to said physical address register, transferring of data read from said main storage to said read data register and transferring of data stored in said write data register to said main storage through said bus means at selectively different times.

2. An information processing system according to claim 1, wherein said storage control unit is constructed in the form of an integrated circuit.

3. An information processing system according to claim 1, wherein said bus means comprises;

a bus;

first gate means connected between said write data register and said bus;

second gate means connected between said main storage and said bus; and third gate means connected between said address translation means and said bus;

each of said first, second and third gate means being selectively opened by said bus control means in response to control signals from said processor unit.

* * * * *